US012344255B2

(12) United States Patent
Ucar et al.

(10) Patent No.: US 12,344,255 B2
(45) Date of Patent: Jul. 1, 2025

(54) DETECTION OF ABNORMAL DRIVING BASED ON BEHAVIOR PROFILES

(71) Applicant: Toyota Motor Engineering & Manufacturing North America, Inc., Plano, TX (US)

(72) Inventors: Seyhan Ucar, Mountain View, CA (US); Emrah Akin Sisbot, Mountain View, CA (US); Kentaro Oguchi, Mountain View, CA (US)

(*) Notice: Subject to any disclaimer, the term of this patent is extended or adjusted under 35 U.S.C. 154(b) by 428 days.

(21) Appl. No.: 17/689,490

(22) Filed: Mar. 8, 2022

(65) Prior Publication Data

US 2023/0286514 A1 Sep. 14, 2023

(51) Int. Cl.
*B60W 40/00* (2006.01)
*B60W 40/09* (2012.01)
*B60W 60/00* (2020.01)

(52) U.S. Cl.
CPC ........ *B60W 40/09* (2013.01); *B60W 60/0017* (2020.02); *B60W 2540/22* (2013.01)

(58) Field of Classification Search
CPC ............. B60W 40/09; B60W 60/0017; B60W 2540/22
USPC .......................................................... 701/1
See application file for complete search history.

(56) References Cited

U.S. PATENT DOCUMENTS

| | | | |
|---|---|---|---|
| 8,948,929 B2 | 2/2015 | Chun et al. | |
| 9,296,299 B2 | 3/2016 | Ricci | |
| 9,731,713 B2 | 8/2017 | Horii | |
| 10,347,127 B2 | 7/2019 | Droz et al. | |
| 10,414,407 B1 | 9/2019 | Slusar | |
| 10,775,179 B1 | 9/2020 | Hayward | |
| 2014/0236414 A1* | 8/2014 | Droz | G06V 20/58 701/1 |
| 2019/0287392 A1* | 9/2019 | Bielby | G08G 1/017 |
| 2020/0023839 A1 | 1/2020 | Yan | |
| 2020/0202713 A1* | 6/2020 | Gesch | G05D 1/0257 |
| 2021/0070286 A1* | 3/2021 | Green | G05D 1/0246 |
| 2021/0125078 A1* | 4/2021 | Malhan | G06N 3/042 |
| 2022/0032924 A1* | 2/2022 | Jeihani | B60W 40/09 |

(Continued)

OTHER PUBLICATIONS

Zohrevand, Zahra et al., "Should i raise the red flag? A comprehensive survey of anomaly scoring methods toward mitigating false alarms," arXiv preprint arXiv:1904.06646 (2019), 11 pages.

(Continued)

*Primary Examiner* — Mahmoud S Ismail
(74) *Attorney, Agent, or Firm* — Burbage Law, P.C.; Jon-Michael Burbage

(57) ABSTRACT

A method according to some embodiments includes sensing, by a sensor set of the ego vehicle, a remote vehicle to generate sensor data describing driving behavior of the remote vehicle. The method further includes classifying a type of the remote vehicle based on the sensor data. The method further includes retrieving a behavior profile for the type of the remote vehicle that identifies criteria for the type of the remote vehicle and classifications of abnormal behavior and normal behavior based on the criteria. The method further includes comparing the behavior of the remote vehicle to the behavior profile for the type of the remote vehicle. The method further includes determining that the behavior of the remote vehicle is normal based on the comparing.

20 Claims, 6 Drawing Sheets

(56) References Cited

U.S. PATENT DOCUMENTS

2022/0281456 A1* 9/2022 Giovanardi ..... B60W 30/18163
2022/0355802 A1* 11/2022 Chaves ................... H04W 4/44

OTHER PUBLICATIONS

Hundman, Kyle et al., "Detecting spacecraft anomalies using lstms and nonparametric dynamic thresholding," Proceedings of the 24th ACM SIGKDD international conference on knowledge discovery & data mining, 2018, 9 pages.

* cited by examiner

DETECTION OF ABNORMAL DRIVING BASED ON BEHAVIOR PROFILES

BACKGROUND

The specification relates to determination of abnormal driving behavior based on vehicle characteristics of a vehicle.

Abnormal driving risks the safety of everyone surrounding a roadway. Abnormal driving may be caused by drivers that are driving aggressively, distractedly, or recklessly. Aggressive driving may be indicated by tailgating or cutting-into a lane. Distracted driving may be evidenced by swerving or a delayed reaction. Reckless driving may be evidenced by running red lights or changing lanes without signaling. Because 55 percent of all accidents include at least one aggressive driver, it is important to identify this type of abnormal behavior. In addition, rear-end collisions are the most frequent type of collision in the United States and 87 percent of rear-end collisions occur due to distracted or reckless driving behavior.

Modern vehicles broadcast vehicle-to-everything (V2X) messages that include digital data describing their locations, speeds, headings, past actions, and future actions, etc. Vehicles that broadcast V2X messages are referred to as "V2X transmitters." Vehicles that receive the V2X messages are referred to as "V2X receivers." The digital data that is included in the V2X messages can be used for various purposes including, for example, the proper operation of Advanced Driver Assistance Systems (ADAS systems) or autonomous driving systems which are included in the V2X receivers.

Modern vehicles include ADAS systems or automated driving systems. An automated driving system is a collection of ADAS systems which provides sufficient driver assistance that a vehicle is autonomous. ADAS systems and automated driving systems are referred to as "vehicle control systems." Other types of vehicle control systems are possible. A vehicle control system includes code and routines, and optionally hardware, that are operable to control the operation of some or all of the systems of a vehicle.

A particular vehicle that includes these vehicle applications is referred to herein as an "ego vehicle" and other vehicles in the vicinity of the ego vehicle are referred to as "remote vehicles."

SUMMARY

One problem associated with abnormal driving behavior is that some behaviors that are abnormal when performed in a car, are perfectly reasonable when performed by a different type of vehicle. For example, when a car leaves too much room between itself and a vehicle in front of it, the vehicle may identify the car as being driven by a distracted driver. However, if a truck carrying a trailer left the same amount of distance between it and the vehicle, this is considered safe driving because the truck takes longer to stop due to its heavy load. In another example, if a car began swerving among the turning lanes, the vehicle may identify the car as being driven by an aggressive driver. However, a truck may perform the same driving behavior because it makes wide turns.

The description below advantageously addresses these issues by classifying a type of remote vehicle and retrieving a behavior profile for the type of remote vehicle that identifies requirements for the type of the remote vehicle. The behavior profile includes classifications of abnormal behavior and normal behavior based on the requirements. As a result, a driver is not needlessly warned about abnormal vehicle behavior for vehicles where the driving behavior is reasonable given their special requirements and limitations.

Examples of the embodiments are now described. One general aspect includes a system of an ego vehicle. The system also includes a non-transitory memory; a sensor set; and a processor communicatively coupled to the non-transitory memory and the sensor set, where the non-transitory memory stores computer readable code that is operable, when executed by the processor, to cause the processor to execute steps including: sensing, by a sensor set of the ego vehicle, a remote vehicle to generate sensor data describing the remote vehicle and driving behavior of the remote vehicle; classifying a type of the remote vehicle based on the sensor data; retrieving a behavior profile for the type of the remote vehicle that identifies criteria for the type of the remote vehicle and classifications of abnormal driving behavior and normal driving behavior based on the criteria; comparing the driving behavior of the remote vehicle to the behavior profile for the type of the remote vehicle; and determining that the driving behavior of the remote vehicle is abnormal based on the comparing.

Implementations may include one or more of the following features. In some embodiments, the steps further include: providing a notification to a driver of the ego vehicle that the remote vehicle is driving abnormally. In some embodiments, retrieving the behavior profile includes querying a behavior model for the behavior profile and the steps further include: receiving feedback from the driver that the remote vehicle is abnormal; and updating the behavior model with the feedback from the driver to change parameters for determining that the driving behavior of the remote vehicle is normal. In some embodiments, feedback incudes a notification provided to the driver. For example, the ego vehicle generates a notification that remote vehicle has swerving behavior and is driving aggressively. The driver of ego vehicle can look at from the mirror and understand that the remote vehicle is large truck and swerving is normal behavior for large trucks when they are performing a turning maneuver. Accordingly, the driver of ego vehicle can press a button it is a false detection. In some embodiments, determining that the behavior of the remote vehicle is abnormal includes determining that the behavior of the remote vehicle satisfies a threshold similarity to the abnormal driving behavior in the behavior profile for the type of remote vehicle. In some embodiments, the sensor data includes an image of the remote vehicle and wherein classifying the type of the remote vehicle includes comparing the image of the remote vehicle to a set of reference images of different types of vehicles. In some embodiments, classifying the type of the remote vehicle is further based on information in a vehicle-to-everything (V2X) message received from the remote vehicle. In some embodiments, retrieving the behavior profile includes receiving a predefined behavior profile from an edge server or a cloud server. In some embodiments, the steps further include: prior to the sensing, receiving a request from a driver to determine whether the driving behavior of the remote vehicle is abnormal. In some embodiments, sensing the remote vehicle occurs responsive to determining that the ego vehicle is in a driving scenario and that a driver of the ego vehicle requested a determination of whether the behavior of the remote vehicle is abnormal when the ego vehicle is in the driving scenario.

One general aspect includes a method executed by an onboard vehicle computer of an ego vehicle. The method includes sensing, by a sensor set of the ego vehicle, a remote vehicle to generate sensor data describing driving behavior of the remote vehicle. The method further includes classifying a type of the remote vehicle based on the sensor data. The method further includes retrieving a behavior profile for the type of the remote vehicle that identifies criteria for the type of the remote vehicle and classifications of abnormal behavior and normal behavior based on the criteria. The method further includes comparing the behavior of the remote vehicle to the behavior profile for the type of the remote vehicle. The method further includes determining that the behavior of the remote vehicle is normal based on the comparing.

In some embodiments, retrieving the behavior profile includes querying a behavior model stored on the ego vehicle for the behavior profile and the method further comprises: receiving feedback from a driver that the driving behavior is abnormal; and updating the behavior model with the feedback from the driver to classify the behavior of the remote vehicle as abnormal. In some embodiments, the sensor data includes an image of the remote vehicle and wherein classifying the type of the remote vehicle includes comparing the image of the remote vehicle to a set of reference images of different types of vehicles. In some embodiments, classifying the type of the remote vehicle is further based on information in a vehicle-to-everything (V2X) message received from the remote vehicle. In some embodiments, retrieving the behavior profile includes receiving a predefined behavior profile from an edge server or a cloud server. In some embodiments, the behavior of the remote vehicle is normal for the type of vehicle when the type of the remote vehicle is not a car and is abnormal if the type of the remote vehicle is the car.

One general aspect may include a computer program product including computer code stored on a non-transitory memory that is operable when executed by an onboard vehicle computer of an ego vehicle, to cause the onboard vehicle computer to execute operations including: sensing, by a sensor set of the ego vehicle, a remote vehicle to generate sensor data describing the remote vehicle and driving behavior of the remote vehicle; classifying a type of the remote vehicle based on the sensor data; retrieving a behavior profile for the type of the remote vehicle that identifies criteria for the type of the remote vehicle and classifications of abnormal driving behavior and normal driving behavior based on the criteria; comparing the driving behavior of the remote vehicle to the behavior profile for the type of the remote vehicle; and determining that the driving behavior of the remote vehicle is abnormal based on the comparing.

In some embodiments, the operations further comprise: providing a notification to a driver of the ego vehicle that the remote vehicle is driving abnormally. In some embodiments, retrieving the behavior profile includes querying a behavior model for the behavior profile and the operations further include: receiving feedback from the driver that the remote vehicle is abnormal; and updating the behavior model with the feedback from the driver to change parameters for determining that the driving behavior of the remote vehicle is normal. In some embodiments, determining that the behavior of the remote vehicle is abnormal includes determining that the behavior of the remote vehicle satisfies a threshold similarity to the abnormal driving behavior in the behavior profile for the type of remote vehicle. In some embodiments, the sensor data includes an image of the remote vehicle and wherein classifying the type of the remote vehicle includes comparing the image of the remote vehicle to a set of reference images of different types of vehicles.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

General Overview

In some embodiments, the detection application includes code and routines that are operable, when executed by a processor, to cause the processor to execute one or more steps of an example general method described herein. The detection application may be an element of one or more of the following: an ego vehicle; a remote connected vehicle; a cloud server; or an edge server installed in a roadway device such as a roadside unit (RSU). As described, the detection application is an element of the ego vehicle, but this description is not intended to be limiting.

Figure 1:
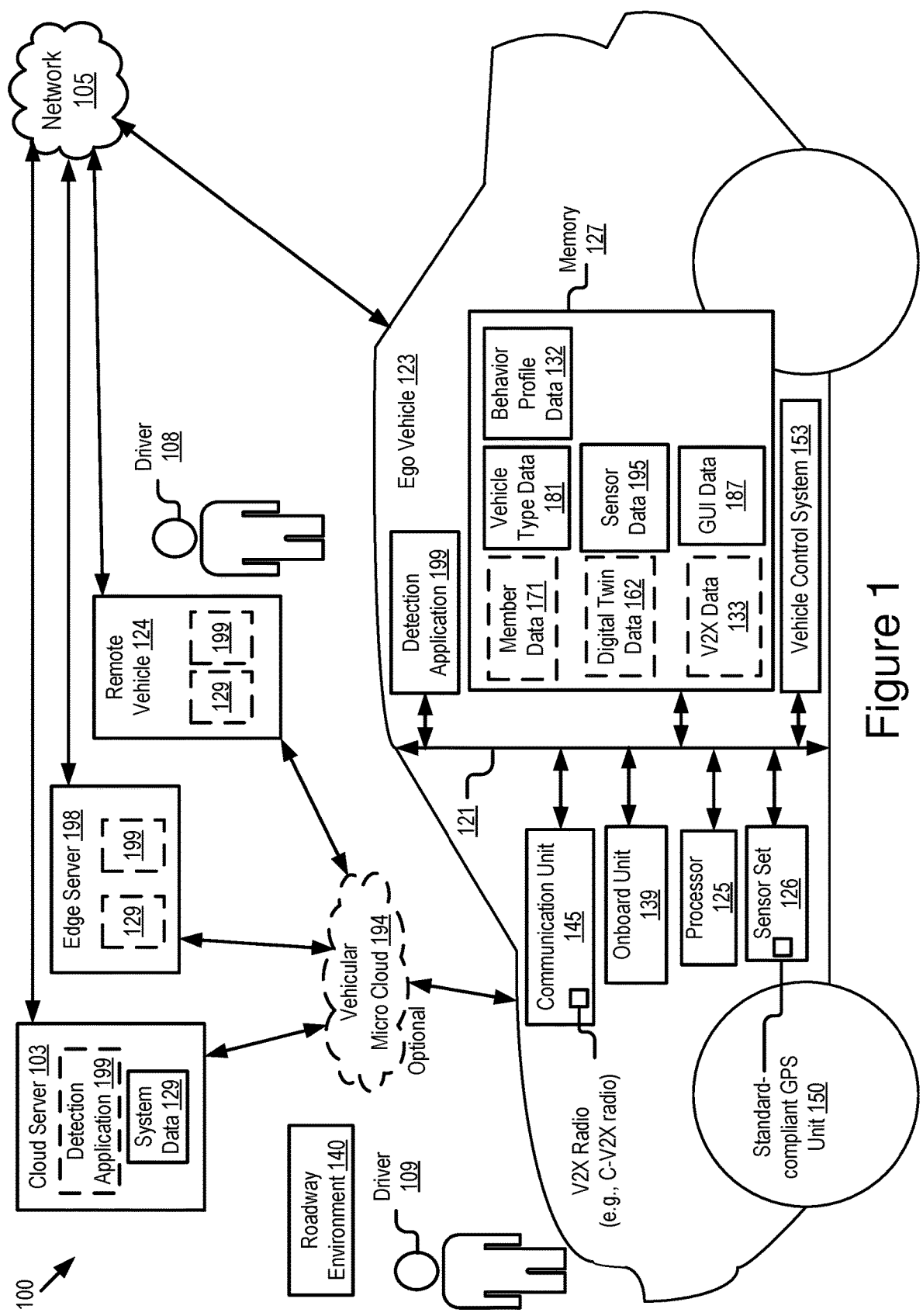
FIG. 1 is a block diagram illustrating an operating environment for a detection application according to some embodiments.

In some embodiments, these steps are executed by a processor or onboard vehicle computer of a connected vehicle, such as the ego vehicle 123 and the remote vehicles 124 illustrated in FIG. 1. A connected vehicle is a vehicle that includes a communication unit.

In some embodiments, one or more steps of the example general method described below are skipped, modified, or performed in a different order. For example, in one embodiment the detection application builds the behavior profile data itself. However, in some embodiments, the behavior profile data is generated or stored at an edge server or cloud server and the detection application of the ego vehicle uses wireless communication with a network (e.g., V2X communication) to download the behavior profile data from the edge server or the cloud server. In some embodiments, the behavior profile data is configured to be geographically specific. For example, an RSU includes an edge server that includes behavior profile data that is specific to the geographical area that is serviced by the RSU. This is beneficial, for example, if a particular geographic area is prone to unique types of abnormal driving behavior or unique patterns of criteria which correspond to the occurrence of a particular abnormal driving behavior. The embodiment described below for the example general method assumes that the detection application of an ego vehicle downloads behavior profile data from a cloud server and organizes the behavior profile data locally in the memory of the ego vehicle.

In some embodiments, a plurality of vehicles on a roadway include instances of the detection application and the detection applications of these vehicles also execute some or all of the steps described below. The steps of the example general method are now described according to some embodiments.

In some embodiments, an ego vehicle senses, by a sensor set, a remote vehicle to generate sensor data describing the remote vehicle and driving behavior of the remote vehicle. The sensor data may include data from a sensor set that is part of the ego vehicle, such as data from cameras, lidar, radar, sonar, and other sensors that record one or more physical characteristics of the physical environment that is proximate to the ego vehicle. The sensor data may be further supplemented by data from a wireless message, such as a vehicle-to-everything (V2X) message transmitted by a communication unit of a connected vehicle such as a remote connected vehicle or the ego vehicle. The sensor data may be further supplemented by data from a vehicular micro cloud.

The detection application classifies a type of the remote vehicle based on the sensor data. For example, the detection application compares images of the remote vehicle to object priors to classify the remote vehicle as a car, an emergency vehicle, a truck, a truck with a trailer, etc. In another example, the detection application uses supplemental data from a V2X message or a vehicular micro cloud to determine or confirm the type of the remote vehicle. For example, the V2X message may be a basic safety message (BSM) that includes an identity of the vehicle or the vehicular micro cloud may include identifying information about the remote vehicle.

The detection application retrieves a behavior profile for the type of the remote vehicle that identifies criteria for the type of the remote vehicle and classifications of abnormal driving behavior and normal driving behavior based on the criteria. The detection application compares the driving behavior of the remote vehicle to the behavior profile for the type of remote vehicle and determines that the driving behavior of the remote vehicle is normal or abnormal based on the comparing. For example, the behavior profile for an emergency vehicle may indicate that normal driving behavior includes swerving in and out of lanes when the emergency vehicle's lights are flashing. While swerving in and out of lanes would be considered abnormal driving behavior for a car, it is expected behavior for an emergency vehicle.

If the detection application determines that the driving behavior is abnormal, the detection application may provide a notification to a driver of the ego vehicle that the remote vehicle is driving abnormally. In some embodiments, the notification includes an option for the driver to provide feedback about the remote vehicle. If the driver indicates that the remote vehicle is driving normally, the detection application may revise a behavior model for determining abnormal driving behavior based on the feedback.

Example Operating Environment 100

Referring now to FIG. 1, depicted is a block diagram illustrating an operating environment 100 for a detection application 199 according to some embodiments. The operating environment 100 may include one or more of the following elements: an ego vehicle 123 (referred to herein as a "vehicle 123" or an "ego vehicle 123") (which has a driver 109 in embodiments where the ego vehicle 123 is not at least a Level III autonomous vehicle); a remote vehicle 124 (which has a driver 108 in embodiments where the remote vehicle 124 is not at least a Level III autonomous vehicle); a cloud server 103; and an edge server 198. These elements are communicatively coupled to one another via a network 105. These elements of the operating environment 100 are depicted by way of illustration. In practice, the operating environment 100 may include one or more of the elements depicted in FIG. 1. For example, although only two vehicles 123, 124 are depicted in FIG. 1, in practice the operating environment 100 can include a plurality of these elements. In some embodiments, the elements of the operating environment 100 are also part of a vehicular micro cloud 194.

The network 105 is a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, Dedicated Short-Range Communication (DSRC), full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, millimeter wave (mmWave), LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, the network 105 is a C-V2X network. C-V2X is defined as 3GPP direct communication (PC5) technologies that include LTE-V2X, 5G NR-V2X, and future 3GPP direct communication technologies. In some embodiments, one or more of the ego vehicle 123 and the remote vehicle 124 are C-V2X equipped vehicles. For example, the ego vehicle 123 includes a standard-compliant GPS unit 150 that is an element of the sensor set 126 and a C-V2X radio that is an element of the communication unit 145. The network 105 may include a C-V2X communication channel shared among the ego vehicle 123 and a second vehicle such as the remote vehicle 124.

A C-V2X radio is hardware radio that includes a C-V2X receiver and a C-V2X transmitter. The C-V2X radio is operable to wirelessly send and receive C-V2X messages on a band that is reserved for C-V2X messages.

The operating environment 100 is present in a roadway environment 140. The roadway environment 140 includes objects. Examples of objects include one or of the following: other vehicles, road surfaces, signs, traffic signals, roadway paint, medians, turns, intersections, animals, pedestrians, debris, potholes, accumulated water, accumulated mud, gravel, roadway construction, cones, bus stops, poles, entrance ramps, exit ramps, breakdown lanes, merging lanes, other lanes, railroad tracks, railroad crossings, and any other tangible object that is present in a roadway environment 140 or otherwise observable or measurable by a camera or some other sensor included in the sensor set.

In some embodiments, the ego vehicle 123 and the remote vehicle 124 include similar elements. For example, each of these elements of the operating environment 100 include their own processor 125, bus 121, memory 127, communication unit 145, processor 125, sensor set 126, onboard unit 139, standard-compliant GPS unit 150, and detection application 199. These elements of the ego vehicle 123 and the remote vehicle 124 provide the same or similar functionality regardless of whether they are included in the ego vehicle 123 or the remote vehicle 124. Accordingly, the descriptions of these elements will not be repeated in this description for each of the ego vehicle 123 and the remote vehicle 124.

In the depicted embodiment, the ego vehicle 123 and the remote vehicle 124 store similar digital data. The system data 129 includes digital data that describes some or all of the digital data stored in the memory 127 or otherwise described herein. The system data 129 is depicted in FIG. 1 as being an element of the cloud server 103, but in practice the system data 129 is stored on one or more of the cloud server 103, the edge server 198, the ego vehicle 123, and one or more of the remote vehicles 124.

The ego vehicle 123 includes a car, a truck, a sports utility vehicle, a bus, a semi-truck, or any other roadway-based conveyance.

The ego vehicle 123 is a connected vehicle. For example, the ego vehicle 123 is communicatively coupled to the network 105 and operable to send and receive messages via the network 105. For example, the ego vehicle 123 transmits and receives V2X messages via the network 105.

The ego vehicle 123 includes one or more of the following elements: a processor 125; a sensor set 126; a standard-compliant GPS unit 150; a vehicle control system 153; a communication unit 145; an onboard unit 139; a memory 127; and a detection application 199. These elements may be communicatively coupled to one another via a bus 121. In some embodiments, the communication unit 145 includes a V2X radio.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 is an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; a vehicle control system (e.g., an ADAS system or autonomous driving system); and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the detection application 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 records sensor measurements that describe the ego vehicle 123 and/or the physical environment (e.g., the roadway environment 140) that includes the ego vehicle 123. The sensor data 195 includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 is operable to record sensor data 195. The sensor data 195 includes digital data that describes images or other measurements of the roadway environment 140, such as the conditions, objects, and other vehicles. Examples of objects include pedestrians, animals, traffic signs, traffic lights, potholes, etc. Examples of conditions include weather conditions, road surface conditions, shadows, leaf cover on the road surface, any other condition that is measurable by a sensor included in the sensor set 126.

In some embodiments, the sensors of the sensor set 126 are operable to collect sensor data 195. The sensors of the sensor set 126 include any sensors that are necessary to measure and record the measurements described by the sensor data 195. For example, the sensor data 195 includes, among other things, one or more of the following: lidar data (i.e., depth information) recorded by an ego vehicle; or camera data (i.e., image information) recorded by the ego vehicle. The lidar data includes digital data that describes depth information about a roadway environment 140 recorded by a lidar sensor of a sensor set 126 included in the ego vehicle 123. The camera data includes digital data that describes the images recorded by a camera of the sensor set 126 included in the ego vehicle 123. The depth information and the images describe the roadway environment 140, including tangible objects in the roadway environment 140 and any other physical aspects of the roadway environment 140 that are measurable using a depth sensor and/or a camera.

Figure 5:
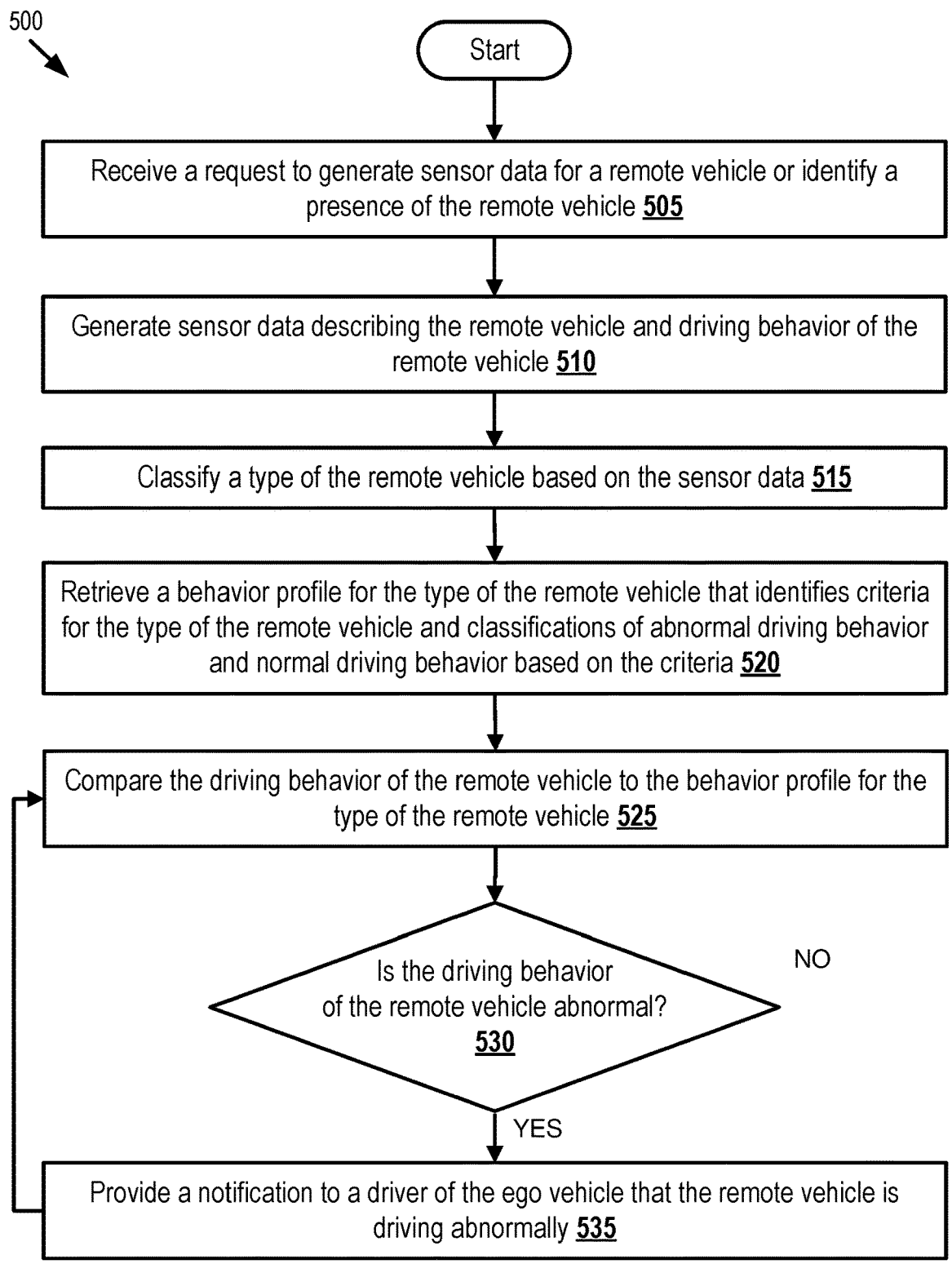
FIG. 5 is a flowchart of an example method for determination of abnormal driving behavior according to some embodiments.
Figure 6:
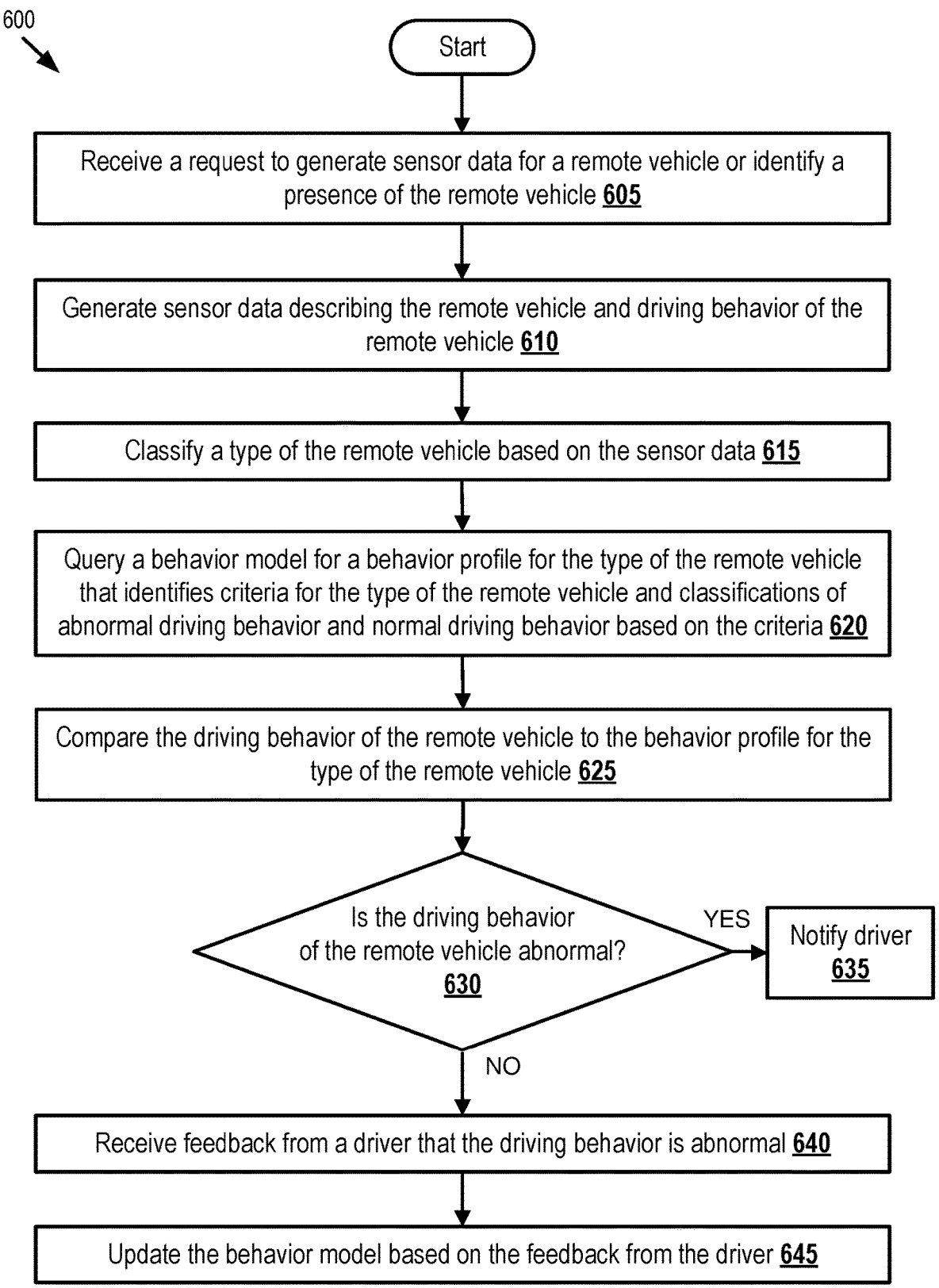
FIG. 6 is a flowchart of another example method for determination of abnormal driving behavior according to some embodiments.

In some embodiments, the sensor data 195 includes digital data that describes any sensor measurements that are necessary for the detection application 199 provides its functionality as described herein with reference to the method 500 depicted in FIG. 5, the method 600 depicted in FIG. 6, and/or the example general method described herein.

In some embodiments, the sensor set 126 includes any sensors that are necessary to record sensor data 195 that describes the roadway environment 140 in sufficient detail to create a digital twin of the roadway environment 140. In some embodiments, the detection application 199 generates the set of nano clouds and assigns sub-tasks to the nano clouds based on the outcomes observed by the detection application 199 during the execution of a set of digital twins that simulate the real-life circumstances of the ego vehicle 123.

In some embodiments the detection application 199 includes simulation software. The simulation software is any simulation software that is capable of simulating an execution of a vehicular micro cloud task. For example, the simulation software is operable simulate the detection application 199 providing its functionality to generate some or all of the system data 129.

Digital Twin

A digital twin is a simulated version of a specific real-world vehicle that exists in a simulation. A structure, condition, behavior, and responses of the digital twin are similar to a structure, condition, behavior, and responses of the specific real-world vehicle that the digital twin represents in the simulation. The digital environment included in the simulation is similar to the real-world roadway environment 140 of the real-world vehicle. The simulation software includes code and routines that are operable to execute simulations based on digital twins of real-world vehicles in the roadway environment. Digital twin data 162 includes any digital data, software, and/or other information that is necessary to execute the digital twin simulations.

In some embodiments, the simulation software is integrated with the detection application 199. In some other embodiments, the simulation software is a standalone software that the detection application 199 can access to execute digital twin simulations to determine, for different types of abnormal driving behavior, which set of criteria correspond to the occurrence of the abnormal driving behavior. In this way, the digital twin simulations are used by the detection application 199 in some embodiments to generate the behavior profile data 132.

Digital twins, and an example process for generating and using digital twins which is implemented by the detection application 199 in some embodiments, are described in U.S. patent application Ser. No. 16/521,574 entitled "Altering a Vehicle based on Driving Pattern Comparison" filed on Jul. 24, 2019, the entirety of which is hereby incorporated by reference.

Vehicular Micro Clouds 194

In some embodiments, one or more of the ego vehicle 123, the remote vehicle 124, the edge server 198, and the network 105 are elements (e.g., members) of a vehicular micro cloud 194. Some of the embodiments described herein include vehicular micro clouds. For example, some or all of the vehicles that are registered with the detection application 199 are connected vehicles (e.g., vehicles that include a processor, a communication unit, and an instance of the detection application 199) and are members of a vehicular micro cloud 194. In some embodiments, the vehicular micro cloud 194 hosts the detection application 199 in a distributed fashion using the computing resources of the vehicles that are members of the vehicular micro cloud 194 so that a cloud server 103 and/or an edge server 198 is not strictly necessary to provide the service of the detection application 199 to the users of the detection application 199.

In some embodiments, the vehicular micro cloud 194 is a stationary vehicular micro cloud such as described by U.S. patent application Ser. No. 15/799,963 filed on Oct. 31, 2017 and entitled "Identifying a Geographic Location for a Stationary Micro-Vehicular Cloud," the entirety of which is herein incorporated by reference. The vehicular micro cloud 194 is depicted with a dashed line in FIG. 1 to indicate that it is an optional element of the operating environment 100.

In some embodiments, the vehicular micro cloud 194 includes a stationary vehicular micro cloud or a mobile vehicular micro cloud. For example, each of the ego vehicle 123 and the remote vehicle 124 are vehicular micro cloud members because they are connected endpoints that are members of the vehicular micro cloud 194 that can access and use the unused computing resources (e.g., their unused processing power, unused data storage, unused sensor capabilities, unused bandwidth, etc.) of the other vehicular micro cloud members using wireless communications that are transmitted via the network 105 and these wireless communicates are not required to be relayed through a cloud server. As used herein, the terms a "vehicular micro cloud" and a "micro-vehicular cloud" mean the same thing.

In some embodiments, a vehicular micro cloud 194 is not a V2X network or a V2V network because, for example, such networks do not include allowing endpoints of such networks to access and use the unused computing resources of the other endpoints of such networks. By comparison, a vehicular micro cloud 194 requires allowing all members of the vehicular micro cloud 194 to access and use designated unused computing resources of the other members of the vehicular micro cloud 194. In some embodiments, endpoints must satisfy a threshold of unused computing resources in order to join the vehicular micro cloud 194. The hub vehicle of the vehicular micro cloud 194 executes a process to: (1) determine whether endpoints satisfy the threshold as a condition for joining the vehicular micro cloud 194; and (2) determine whether the endpoints that do join the vehicular micro cloud 194 continue to satisfy the threshold after they join as a condition for continuing to be members of the vehicular micro cloud 194.

In some embodiments, a member of the vehicular micro cloud 194 includes any endpoint (e.g., the ego vehicle 123, the remote vehicle 124, the edge server 198, etc.) which has completed a process to join the vehicular micro cloud 194 (e.g., a handshake process with the coordinator of the vehicular micro cloud 194). The cloud server 103 is excluded from membership in the vehicular micro cloud 194 in some embodiments. A member of the vehicular micro cloud 194 is described herein as a "member" or a "micro cloud member." In some embodiments, a coordinator of the vehicular micro cloud 194 is the hub of the vehicular micro cloud (e.g., the ego vehicle 123).

Vehicular micro clouds 194 provide vehicular micro cloud tasks. A vehicular micro cloud task includes any task executed by a vehicular micro cloud 194 or a group of vehicular micro clouds 194. As used herein, the terms "task" and "vehicular micro cloud task" refer to the same thing. A "sub-task" as used herein is a portion of a task or vehicular micro cloud task. An example of a task includes, for example, determining and executing vehicle driving maneuvers that eliminates an origin of an abnormal driving behavior identified by the detection application.

In some embodiments, the vehicular micro cloud tasks provided by the vehicular micro cloud 194 includes some or all of the tasks which are necessary to provide the functionality of the detection application 199 described herein. In some embodiments, a vehicular micro cloud includes a group of connected vehicles that communicate with one another via V2X messages to provide the service of the detection application 199 to the ego vehicle 123 and/or the members of the vehicular micro cloud 194.

In some embodiments, a vehicular micro cloud task includes any computational, data storage, or data communication task collaboratively performed by a plurality of the members of a vehicular micro cloud 194. In some embodiments, the set of tasks described above with regards to the example general method include one or more vehicular micro cloud tasks as described herein.

In some embodiments, a computational task includes a processor executing code and routines to output a result. The result includes digital data that describes the output of executing the code and routines. For example, a computational task includes a processor executing code and routines to solve a problem (e.g., classifying a type of the remote vehicle 124 based on the sensor data 195), and the result includes digital data that describes the solution to the problem (e.g., behavior profile data 132 that corresponds to the type of the remote vehicle 124). In some embodiments, the computational task is broken down into sub-tasks whose completion is equivalent to completion of the computational task. In this way, the processors of a plurality of micro cloud members are assigned different sub-tasks configured to complete the computational task; the micro cloud members take steps to complete the sub-tasks in parallel and share the result of the completion of the sub-task with one another via V2X wireless communication. In this way, the plurality of micro cloud members work together collaboratively to complete the computational task. The processors include, for example, the onboard units or electronic control units (ECUs) of a plurality of connected vehicles that are micro cloud members.

In some embodiments, the memory 127 of one or more of the endpoints stores member data 171. The member data 171 is digital data that describes one or more of the following: the identity of each of the micro cloud members; what digital data, or bits of data, are stored by each micro cloud member; what computing services are available from each micro cloud member; what computing resources are available from each micro cloud member and what quantity of these resources are available; and how to communicate with each micro cloud member.

In some embodiments, the member data 171 describes logical associations between endpoints which are a necessary component of the vehicular micro cloud 194 and serves to differentiate the vehicular micro cloud 194 from a mere V2X network. In some embodiments, a vehicular micro cloud 194 must include a hub vehicle and this is a further differentiation from a vehicular micro cloud 194 and a V2X network or a group, clique, or platoon of vehicles which is not a vehicular micro cloud 194.

In some embodiments, the member data 171 describes the logical associations between more than one vehicular micro cloud. For example, the member data 171 describes the logical associations between the first vehicular micro cloud and the second vehicular micro cloud. Accordingly, in some embodiments the memory 127 includes member data 171 for more than one vehicular micro cloud 194.

Vehicle Control System 153

In some embodiments, the ego vehicle 123 includes an autonomous vehicle or a semi-autonomous vehicle. Autonomous vehicles include Advanced Driver Assistance Systems (ADAS systems) or automated driving systems. These systems are referred to herein collectively or individually as a "vehicle control system". An automated driving system includes a sufficient number of ADAS systems so that the vehicle which includes these ADAS systems is rendered autonomous by the benefit of the functionality received by the operation of the ADAS systems by a processor of the vehicle.

In some embodiments, the ego vehicle 123 is a Level III autonomous vehicle or higher as defined by the National Highway Traffic Safety Administration and the Society of Automotive Engineers. In some embodiments, the vehicle control system 153 is an autonomous driving system.

In some embodiments, the ego vehicle 123 includes a vehicle control system 153. A vehicle control system 153 includes one or more ADAS systems or an autonomous driving system. In some embodiments, the detection application 199 uses some or all of the payload of the set of wireless messages described herein as inputs to the vehicle control system 153 to improve the operation of the vehicle control system 153 by increasing the quantity of data it has access to when controlling the operation of the ego vehicle 123.

Examples of an ADAS system include one or more of the following elements of a vehicle: an adaptive cruise control ("ACC") system; an adaptive high beam system; an adaptive light control system; an automatic parking system; an automotive night vision system; a blind spot monitor; a collision avoidance system; a crosswind stabilization system; a driver drowsiness detection application; a driver monitoring system; an emergency driver assistance system; a forward collision warning system; an intersection assistance system; an intelligent speed adaption system; a lane keep assistance ("LKA") system; a pedestrian protection system; a traffic sign recognition system; a turning assistant; and a wrong-way driving warning system. Other types of ADAS systems are possible. This list is illustrative and not exclusive.

An ADAS system is an onboard system that is operable to identify one or more factors (e.g., using one or more onboard vehicle sensors) affecting the ego vehicle 123 and modify (or control) the operation of its host vehicle (e.g., the ego vehicle 123) to respond to these identified factors. Described generally, ADAS system functionality includes the process of (1) identifying one or more factors affecting the ego vehicle and (2) modifying the operation of the ego vehicle, or some component of the ego vehicle, based on these identified factors.

For example, an ACC system installed and operational in an ego vehicle may identify that a subject vehicle being followed by the ego vehicle with the cruise control system engaged has increased or decreased its speed. The ACC system may modify the speed of the ego vehicle based on the change in speed of the subject vehicle, and the detection of this change in speed and the modification of the speed of the ego vehicle is an example the ADAS system functionality of the ADAS system.

Similarly, an ego vehicle 123 may have a LKA system installed and operational in an ego vehicle 123 may detect, using one or more external cameras of the ego vehicle 123, an event in which the ego vehicle 123 is near passing a center yellow line which indicates a division of one lane of travel from another lane of travel on a roadway. The LKA system may provide a notification to a driver of the ego vehicle 123 that this event has occurred (e.g., an audible noise or graphical display) or take action to prevent the ego vehicle 123 from actually passing the center yellow line such as making the steering wheel difficult to turn in a direction that would move the ego vehicle over the center yellow line or actually moving the steering wheel so that the ego vehicle 123 is further away from the center yellow line but still safely positioned in its lane of travel. The process of identifying the event and acting responsive to this event is an example of the ADAS system functionality provided by the LKA system.

The other ADAS systems described above each provide their own examples of ADAS system functionalities which are known in the art, and so, these examples of ADAS system functionality will not be repeated here.

In some embodiments, the ADAS system includes any software or hardware included in the vehicle that makes that vehicle be an autonomous vehicle or a semi-autonomous vehicle. In some embodiments, an autonomous driving system is a collection of ADAS systems which provides sufficient ADAS functionality to the ego vehicle 123 to render the ego vehicle 123 an autonomous or semi-autonomous vehicle.

The standard-compliant GPS unit 150 includes a GPS unit that is compliant with one or more standards that govern the transmission of V2X wireless communications ("V2X communication" if singular, "V2X communications" if plural). For example, some V2X standards require that BSMs are transmitted at intervals by vehicles and that these BSMs must include within their payload GPS data having one or more attributes.

An example of an attribute for GPS data is accuracy. In some embodiments, the standard-compliant GPS unit 150 is operable to generate GPS measurements which are sufficiently accurate to describe the location of the ego vehicle 123 with lane-level accuracy. Lane-level accuracy is necessary to comply with some of the existing and emerging standards for V2X communication (e.g., C-V2X communication). Lane-level accuracy means that the GPS measurements are sufficiently accurate to describe which lane of a roadway that the ego vehicle 123 is traveling (e.g., the geographic position described by the GPS measurement is accurate to within 1.5 meters of the actual position of the ego vehicle 123 in the real-world). Lane-level accuracy is described in more detail below.

In some embodiments, the standard-compliant GPS unit 150 is compliant with one or more standards governing V2X communications but does not provide GPS measurements that are lane-level accurate.

In some embodiments, the standard-compliant GPS unit 150 includes any hardware and software necessary to make the ego vehicle 123 or the standard-compliant GPS unit 150 compliant with one or more of the following standards governing V2X communications, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the standard-compliant GPS unit 150 is operable to provide GPS data describing the location of the ego vehicle 123 with lane-level accuracy. For example, the ego vehicle 123 is traveling in a lane of a multi-lane roadway. Lane-level accuracy means that the lane of the ego vehicle 123 is described by the GPS data so accurately that a precise lane of travel of the ego vehicle 123 may be accurately determined based on the GPS data for this ego vehicle 123 as provided by the standard-compliant GPS unit 150.

An example process for generating GPS data describing a geographic location of an object (e.g., a vehicle, a roadway object, an object of interest, a remote vehicle 124, the ego vehicle 123, or some other tangible object or construct located in a roadway environment 140) is now described according to some embodiments. In some embodiments, the detection application 199 include code and routines that are operable, when executed by the processor 125, to cause the processor to: analyze (1) GPS data describing the geographic location of the ego vehicle 123 and (2) sensor data describing the range separating the ego vehicle 123 from an object and a heading for this range; and determine, based on this analysis, GPS data describing the location of the object. The GPS data describing the location of the object may also have lane-level accuracy because, for example, it is generated using accurate GPS data of the ego vehicle 123 and accurate sensor data describing information about the object.

In some embodiments, the standard-compliant GPS unit 150 includes hardware that wirelessly communicates with a GPS satellite (or GPS server) to retrieve GPS data that describes the geographic location of the ego vehicle 123 with a precision that is compliant with a V2X standard. One example of a V2X standard is the DSRC standard. Other standards governing V2X communications are possible. The DSRC standard requires that GPS data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the GPS data is less than 1.5 meters the detection application 199 described herein may analyze the GPS data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of a vehicle (e.g., the ego vehicle 123) with lane-level accuracy. For example, a typical roadway lane is approximately 3 meters wide. However, a conventional GPS unit only has an accuracy of plus or minus 10 meters relative to the actual location of the ego vehicle 123. As a result, such conventional GPS units are not sufficiently accurate to enable the detection application 199 to determine the lane of travel of the ego vehicle 123. This measurement improves the accuracy of the GPS data describing the location of lanes used by the ego vehicle 123 when the detection application 199 is providing its functionality.

In some embodiments, the memory 127 stores two types of GPS data. The first is GPS data of the ego vehicle 123 and the second is GPS data of one or more objects (e.g., the remote vehicle 124 or some other object in the roadway environment). The GPS data of the ego vehicle 123 is digital data that describes a geographic location of the ego vehicle 123. The GPS data of the objects is digital data that describes a geographic location of an object. One or more of these two types of GPS data may have lane-level accuracy.

In some embodiments, one or more of these two types of GPS data are described by the sensor data 195. For example, the standard-compliant GPS unit 150 is a sensor included in the sensor set 126 and the GPS data is an example type of sensor data 195.

The communication unit 145 transmits and receives data to and from a network 105 or to another communication channel. In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a radio that is operable to transmit and receive V2X messages via the network 105. For example, the communication unit 145 includes a radio that is operable to transmit and receive any type of V2X communication described above for the network 105.

In some embodiments, the communication unit 145 includes a full-duplex coordination system as described in U.S. Pat. No. 9,369,262 filed on Aug. 28, 2014 and entitled "Full-Duplex Coordination System," the entirety of which is incorporated herein by reference. In some embodiments, some, or all of the communications necessary to execute the methods described herein are executed using full-duplex wireless communication as described in U.S. Pat. No. 9,369, 262.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, etc.

Figure 3:
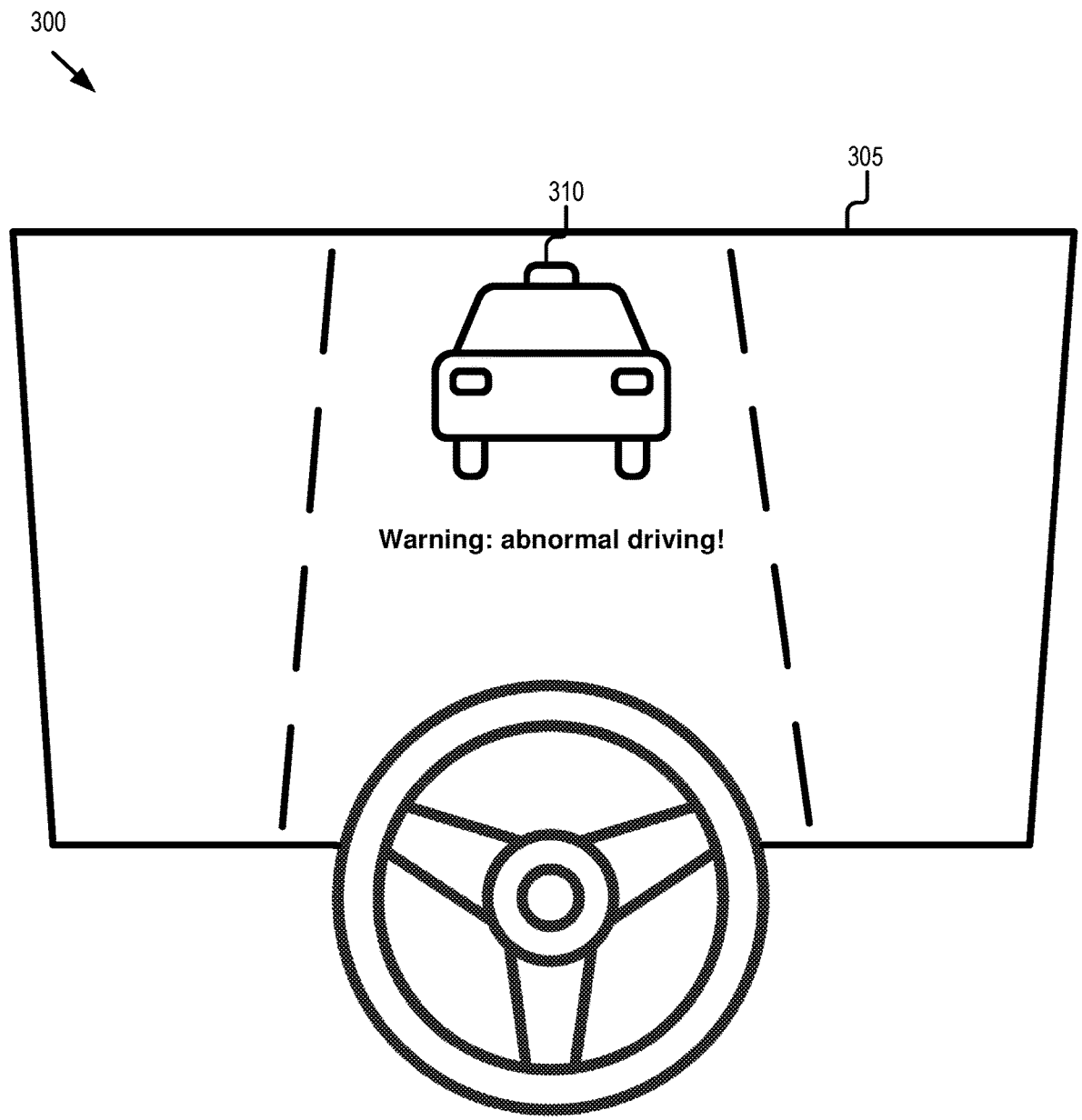
FIG. 3 is an example of a heads-up display that includes a warning of abnormal driving behavior according to some embodiments.

In some embodiments, the communication unit 145 includes a V2X radio. The V2X radio is a hardware unit that includes one or more transmitters and one or more receivers that is operable to send and receive any type of V2X message. In some embodiments, the V2X radio is a C-V2X radio that is operable to send and receive C-V2X messages. In some embodiments, the C-V2X radio is operable to send and receive C-V2X messages on the upper 30 MHz of the 5.9 GHz band (i.e., 5.895-5.925 GHz). In some embodiments, some or all of the wireless messages described above with reference to the method 300 depicted in FIG. 3 are transmitted by the C-V2X radio on the upper 30 MHz of the 5.9 GHz band (i.e., 5.895-5.925 GHz) as directed by the detection application 199.

In some embodiments, the V2X radio includes a non-transitory memory which stores digital data that controls the frequency for broadcasting BSMs or CPMs. In some embodiments, the non-transitory memory stores a buffered version of the GPS data for the ego vehicle 123 so that the GPS data for the ego vehicle 123 is broadcast as an element of the BSMs or CPMs which are regularly broadcast by the V2X radio (e.g., at an interval of once every 0.10 seconds).

In some embodiments, the V2X radio includes any hardware or software which is necessary to make the ego vehicle 123 compliant with any wireless communication standard that applies to wireless vehicular communications. In some embodiments, the standard-compliant GPS unit 150 is an element of the V2X radio.

The memory 127 may include a non-transitory storage medium. The memory 127 may store instructions or data that may be executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

As depicted in FIG. 1, the memory 127 stores the following digital data: sensor data 195; the GPS data (as an element of the sensor data 195); the V2X data 133; vehicle type data 181; behavior profile data 132; GUI data 187; the member data 171; and the digital twin data 162. The system data 129 includes some or all of this digital data. In some embodiments, the V2X messages (or C-V2X messages or the set of wireless messages) described herein are also stored in the memory 127. The member data 171, the digital twin data 162 were described above with reference to the vehicular micro cloud 194 and the digital twin simulations, respectively, and so, those descriptions will not be repeated here.

As described above, the sensor set 126 generates the sensor data 195, which is used both to determine a type of remote vehicle 124 and driving behavior of the remote vehicle 124. In some embodiments, the ego vehicle 123 also receives V2X data 133, either from the remote vehicle 124 for from the vehicular micro cloud 194. In some embodiments, the V2X data 133 includes a basic safety message (BSM) that describes the type of remote vehicle 124. The detection application 199 may use the V2X data to determine the type of remote vehicle 124 either in addition or instead of using the sensor data 195.

The vehicle type data 181 is digital data that describes different types of vehicles. In some embodiments, the vehicle type data 181 includes images of vehicle types that the detection application 199 can compare to sensor data 195 that includes images of a remote vehicle 124 for comparison (e.g., object priors, reference images, etc.), attributes of different types of vehicles, etc.

The behavior profile data 132 is digital data that describes, for each type of remote vehicle, criteria for the type of remote vehicle and classifications of abnormal driving behavior and normal driving behavior based on the criteria. The detection application 199 uses the behavior profile data 132 to determine whether the driving behavior of the remote vehicle 124 is abnormal driving behavior or normal driving behavior. In some embodiments, the behavior profile data 132 includes threshold for how many of the criteria have to occur to categorize the driving behavior of the remote vehicle 124 as abnormal driving behavior.

The graphical user interface (GUI) data 187 is digital data that is generated by the detection application 199 and displayed to provide information about the remote vehicle and other situations. For example, if the detection application 199 determines that the driving behavior of the remote vehicle 124 is abnormal driving behavior, the GUI data 187 may include a notification of a warning for the driver 109 of the ego vehicle 123. The GUI data 187 may also include digital data for displaying a user interface where the driver 109 can provide preference information, such as when the driver 109 wants to be warned about abnormal driving. The GUI data 187 may also include digital data for displaying a user interface for providing feedback information, such as when the driver 109 determines that a warning is wrong because the abnormal driving behavior is normal, where the remote vehicle 124 is driving abnormally, etc.

In some embodiments, the detection application 199 includes code and routines that are operable, when executed by the processor 125, to execute one or more steps of the example general method described herein. In some embodiments, the detection application 199 includes code and routines that are operable, when executed by the processor 125, to execute one or more steps of the method 500 described below with reference to FIG. 5 or the method 600 described below with reference to FIG. 6.

In some embodiments, the detection application 199 is an element of the onboard unit 139 or some other onboard vehicle computer. In some embodiments, the detection application 199 includes code and routines that are stored in the memory 127 and executed by the processor 125 or the onboard unit 139. In some embodiments, the detection application 199 is an element of an onboard unit of the ego vehicle 123 which executes the detection application 199 and controls the operation of the communication unit 145 of the ego vehicle 123 based at least in part on the output from executing the detection application 199.

In some embodiments, the detection application 199 is implemented using hardware including a field-programmable gate array ("FPGA") or an application-specific integrated circuit ("ASIC"). In some other embodiments, the detection application 199 is implemented using a combination of hardware and software.

In some embodiments, the edge server 198 is a connected processor-based computing device that includes an instance of the detection application 199 and the other elements described above with reference to the ego vehicle 123 (e.g., a processor 125, a memory 127 storing the system data 129, a communication unit 145, etc.). In some embodiments, the edge server 198 provides information to the detection application 199 stored on the ego vehicle 123 to aid in identifying abnormal driving behavior.

In some embodiments, the edge server 198 includes one or more of the following: a hardware server; a personal computer; a laptop; a device such as a roadside unit; or any other processor-based connected device that is not a member of the vehicular micro cloud 194 and includes an instance of the detection application 199 and a non-transitory memory that stores some or all of the digital data that is stored by the memory 127 of the ego vehicle 123 or otherwise described herein. For example, the memory 127 stores the system data 129. The system data 129 includes some or all of the digital data depicted in FIG. 1 as being stored by the memory 127.

In some embodiments, the edge server 198 includes a backbone network. In some embodiments, the edge server 198 includes an instance of the detection application 199. The functionality of the detection application 199 is described above with reference to the ego vehicle 123, and so, that description will not be repeated here.

In some embodiments, the cloud server 103 one or more of the following: a hardware server; a personal computer; a laptop; a device such as a roadside unit; or any other processor-based connected device that is not a member of the vehicular micro cloud 194 and includes an instance of the detection application 199 and a non-transitory memory that stores some or all of the digital data that is stored by the memory 127 of the ego vehicle 123 or otherwise described herein. For example, the memory 127 stores the system data 129. In some embodiments, the cloud server 103 is operable to enable a detection application 199 of the ego vehicle 123 to provide digital data for a false positive and the detection application of the cloud server 103 is operable to analyze this digital data and determine edits for the behavior profile data 132 for the type of abnormal driving behavior that resulted in the false positive. For example, the subset of the behavior profile data 132 that is sufficient to trigger the early detection of the abnormal driving behavior is modified so that future false positives are reduced.

In some embodiments, the cloud server 103 is operable to provide any other functionality described herein, such as providing information to the ego vehicle 123 about a type of remote vehicle 124. For example, the cloud server 103 is operable to execute some or all of the steps of the methods described herein.

In some embodiments, the cloud server 103 includes behavior profile data 132 that is indexed based on the different types of abnormal driving behaviors. In some embodiments, the behavior profile data 132 is indexed based on geographic location so that a vehicle can upload their GPS data as a query to the behavior profile data 132 and receive a response that includes a subset of the behavior profile data 132 that is tailored to the geographic area associated with the GPS data.

Example Computing Device 200

Figure 2:
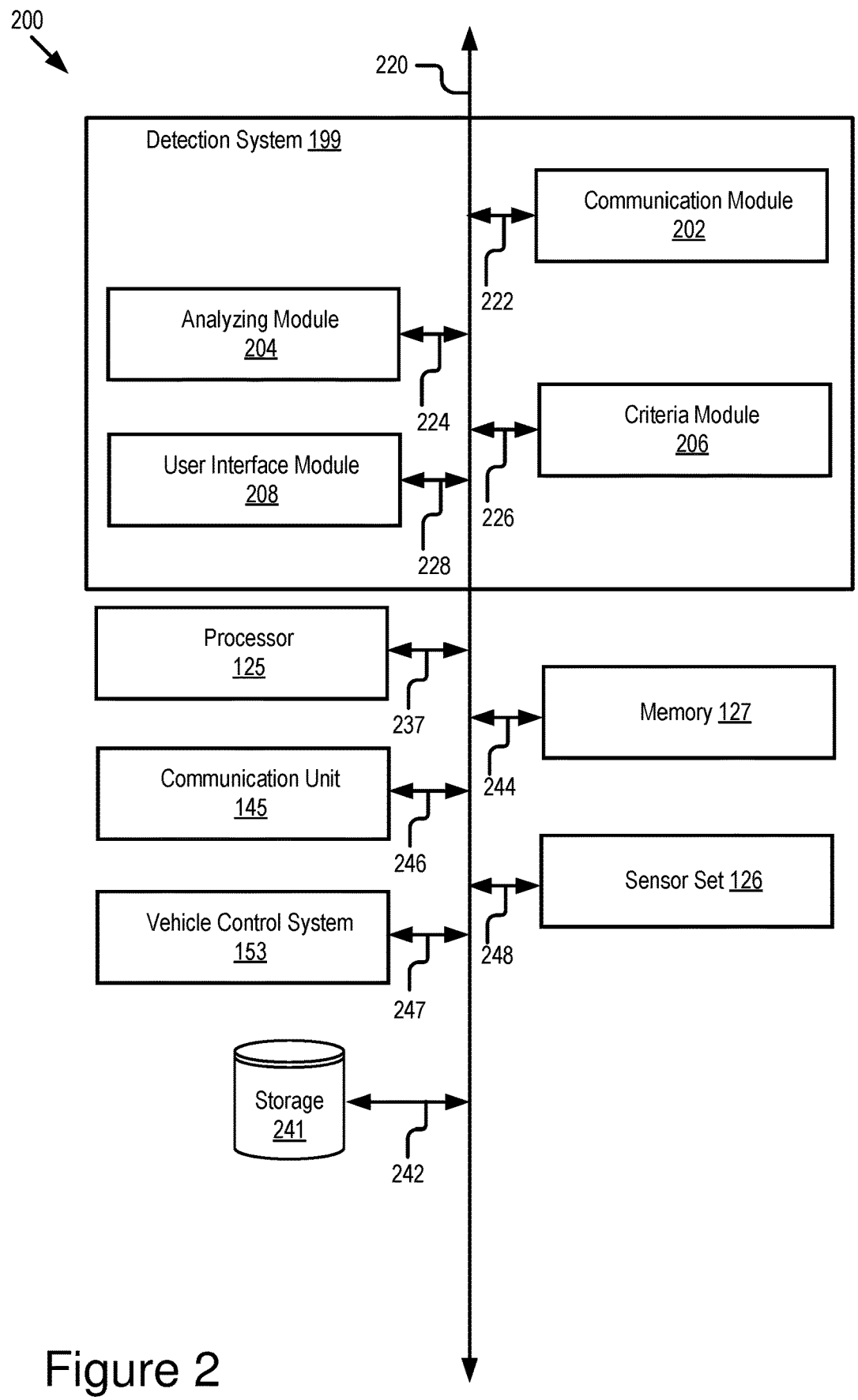
FIG. 2 is a block diagram illustrating an example computing device including a detection application according to some embodiments.

Referring now to FIG. 2, depicted is a block diagram illustrating an example computer system 200 including a detection application 199 according to some embodiments. In some embodiments, the computer system 200 may include a special-purpose computer system that is programmed to perform one or more steps of one or more of the method 500 described herein with reference to FIG. 5 or the method 600 described herein with reference to FIG. 6. In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the detection application 199; a processor 125; a memory 127; a communication unit 145; a sensor set 126; a vehicle control system 153; and a storage 241. The components of the computer system 200 are communicatively coupled by a bus 220. In some embodiments, the computer system 200 includes additional elements such as those depicted in FIG. 1 as elements of the detection application 199.

In the illustrated embodiment, the processor 125 is communicatively coupled to the bus 220 via signal line 237. The memory 127 is communicatively coupled to the bus 220 via signal line 244. The communication unit 145 is communicatively coupled to the bus 220 via signal line 246. The sensor set 126 is communicatively coupled to the bus 220 via signal line 248. The vehicle control system 153 is communicatively coupled to the bus 220 via signal line 247. The storage 241 is communicatively coupled to the bus 220 via signal line 242.

In some embodiments, the sensor set 126 includes standard-compliant GPS unit. In some embodiments, the communication unit 145 includes a sniffer.

The following elements of the computer system 200 were described above with reference to FIG. 1, and so, these descriptions will not be repeated here: the processor 125; the memory 127; the communication unit 145; the sensor set 126; and the vehicle control system 153.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage 241 stores behavior profiles for each type of remote vehicle that identifies criteria for the type of the remote vehicle 124 and classifications of abnormal driving behavior and normal driving behavior based on the criteria. The behavior profiles may be generated by the detection system 199 stored on the ego vehicle 123, received from the cloud server 103, or received from the edge server 198.

Figure 4:
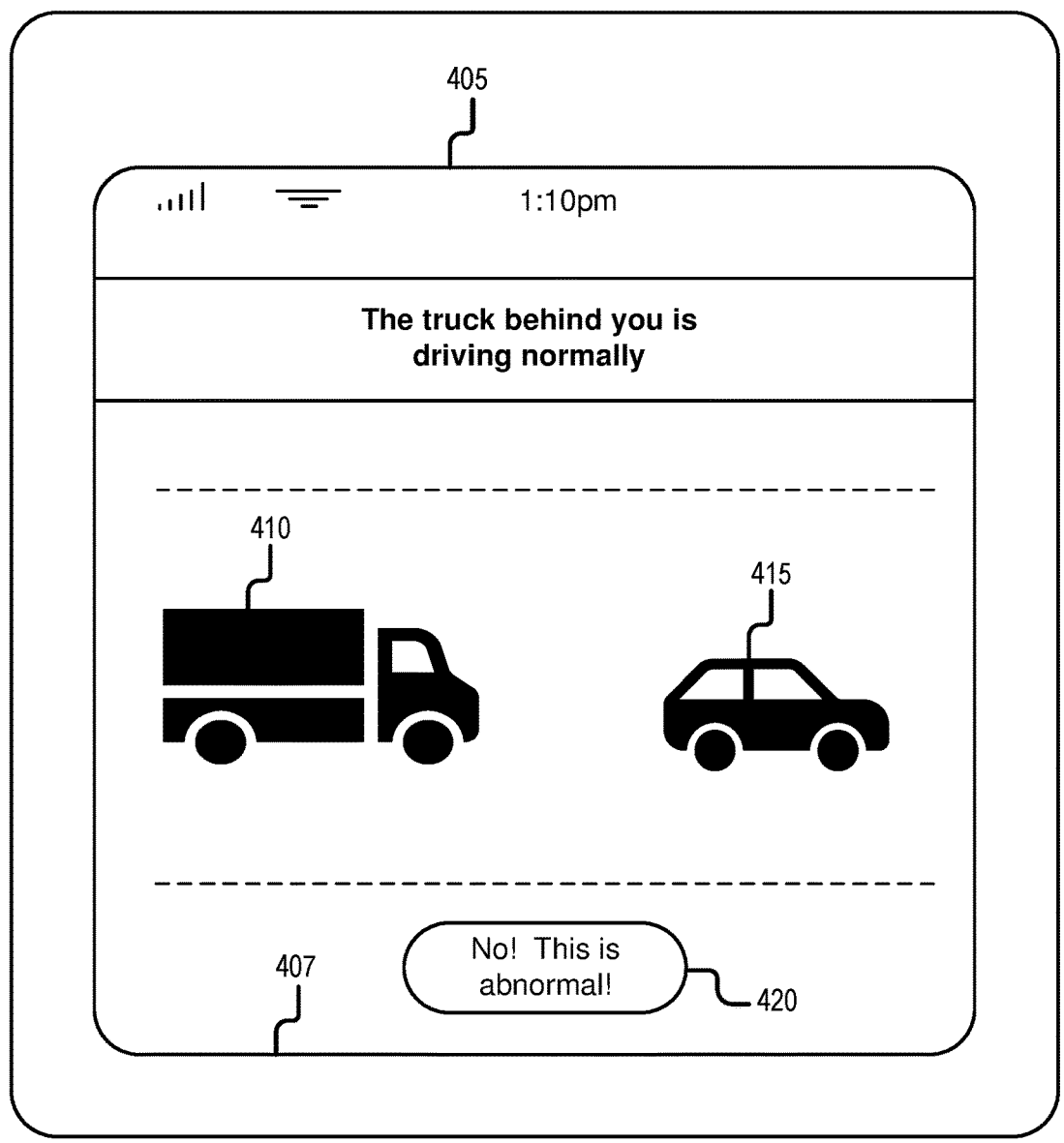
FIG. 4 is an example of a mobile display device illustrating an option for reporting abnormal driving behavior according to some embodiments.

In some embodiments, the detection application 199 includes code and routines that are operable, when executed by the processor 125, to cause the processor 125 to execute one or more steps of the method 400 described herein with reference to FIG. 4 or the method 500 described herein with reference to FIG. 5. In some embodiments, the detection application 199 includes code and routines that are operable, when executed by the processor 125, to cause the processor 125 to execute one or more steps of the example general method.

In the illustrated embodiment shown in FIG. 2, the detection application 199 includes a communication module 202, an analyzing module 204, a criteria module 206, and a user interface module 208.

The communication module 202 can be software including routines for handling communications between the detection application 199 and other components of the computer system 200. In some embodiments, the communication module 202 can be a set of instructions executable by the processor 125 to provide the functionality described below for handling communications between the detection application 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 may receive V2X messages from the remote vehicle 124 and transmit the V2X messages to the detection application 199.

In some embodiments, the communication module 202 may handle communications between components of the detection application 199 or the computer system 200. For example, the communication module 202 may transmit sensor data 195 from the sensor set 126 describing the remote vehicle 124 to the analyzing module 204 and sensor data 195 from the sensor set 126 describing behavior of the remote vehicle 124 to the criteria module 206. The communication module 202 may also transmit a determination of a type of remote vehicle 124 from the analyzing module 204 to the criteria module 206.

In some embodiments, the communication module 202 receives data from components of the detection application 199 and stores the data in one or more of the storage 241 and the memory 127. For example, the communication module 202 may store feedback information from a driver provided via a user interface to the storage 241.

The analyzing module 204 can be software including routines for classifying a type of remote vehicle 124 based on sensor data 195. In some embodiments, the analyzing module 204 can be a set of instructions executable by the processor 125 to provide the functionality described below for classifying the type of remote vehicle 124. In some embodiments, the analyzing module 204 can be stored in the memory 127 of the computer system 200 and can be accessible and executable by the processor 125. The analyzing module 204 may be adapted for cooperation and communication with the processor 125 and other components of the computer system 200 via signal line 224.

In some embodiments, the analyzing module 204 receives sensor data 195 from the sensor set 126 via the communication module 202. The analyzing module 204 classifies a type of the remote vehicle 124 based on the sensor data 195. For example, the sensor data 195 may include an image of the remote vehicle 124 captured by a rear camera on the ego vehicle 123. The analyzing module 204 may compare the image of the remote vehicle 124 to an object prior or a reference image that identifies a type of vehicle. For example, the analyzing module 204 may determine that the image of the remote vehicle 124 is 85% similar to a semi-trailer truck, 70% similar to a straight truck, and 50% similar to a flatbed truck. The analyzing module 204 may classify the type of remote vehicle 124 as being associated with the type of vehicle that has the highest matching percentage.

In some embodiments, the analyzing module 204 uses information from V2X messages received directly from the remote vehicle 124 or from a cloud server 103 or an edge server 198. The V2X message may be a BSM message that includes an identification of the type of remote vehicle 124 or a message with various types of metadata that can be used by the analyzing module 204 to infer the type of remote vehicle 124. In some embodiments, the V2X message includes metadata generated as part of the vehicular micro cloud 194. This information may be used in addition to the sensor data 195 or instead of the sensor data 195 to classify the type of remote vehicle 124.

In some embodiments, the analyzing module 204 uses machine learning to classify a type of remote vehicle 124. For example, the analyzing module 204 may generate a machine-learning model based on training data that includes images of vehicles that are associated with labels that identify the type of vehicle in the images. The machine-learning model may receive an image of the remote vehicle 124 as input and generate a classification of the type of remote vehicle 124 as output.

In some embodiments, when the user interface module 208 discussed below provides a user interface to a driver 109 of the ego vehicle 123 that includes a notification about the remote vehicle 124, the notification includes an identification of the type of remote vehicle 124. The driver 109 may provide feedback about the accuracy of the classification. The analyzing module 204 uses the feedback to revise its determinations. For example, if the analyzing module 204 uses a machine-learning model to output a type of the remote vehicle 124, the analyzing module 204 may modify the parameters of the machine-learning model based on the feedback from the driver 109.

The criteria module 206 can be software including routines for determining whether driving behavior of the remote vehicle 124 is normal or abnormal. In some embodiments, the criteria module 206 can be a set of instructions executable by the processor 125 to provide the functionality described below for determining whether the driving behavior of the remote vehicle 124 is normal or abnormal. In some embodiments, the criteria module 206 can be stored in the memory 127 of the computer system 200 and can be accessible and executable by the processor 125. The criteria module 206 may be adapted for cooperation and communication with the processor 125 and other components of the computer system 200 via signal line 226.

In some embodiments, the criteria module 206 receives sensor data 195 describing the driving behavior of the remote vehicle 124 from the sensor set 126 via the communication module 202. For example, the sensor data 195 describes speed, distance between the ego vehicle 123 and the remote vehicle 124, whether the remote vehicle 124 stays within the lane, etc. The criteria module 206 receives a type of the remote vehicle 124 from the analyzing module 204 via the communication module 202. In some embodiments, the criteria module 206 also receives a likelihood that the remote vehicle 124 is the type of vehicle. For example, the criteria module 206 may receive a 95% likelihood that the remote vehicle 124 is a police car.

In some embodiments, the criteria module 206 retrieves behavior profile data 132 that describes a behavior profile from the memory 127 for the type of the remote vehicle that identifies criteria for the type of the remote vehicle. The behavior profile includes classifications of abnormal driving behavior and normal driving behavior based on the criteria.

In some embodiments, the criteria module 206 determines that the driving behavior of the remote vehicle 124 is abnormal or normal driving behavior based on determining if the driving behavior of the remote vehicle 124 satisfies a threshold similarity to the abnormal driving behavior in the behavior profile for the type of remote vehicle 124. For example, the criteria module 206 retrieves behavior profile data 132 that includes a threshold for how many of the criteria have to occur to categorize the driving behavior of the remote vehicle 124 as abnormal driving behavior.

In other embodiments, the criteria module 206 retrieves a predefined behavior profile from the edge server 198 or the cloud server 103. For example, the criteria module 206 may query the edge server 198 or the cloud server 103 for a behavior profile that corresponds to the type of remote vehicle 124 in a particular geographic area. The predefined behavior profile may include rules written in a formal language for what constitutes normal and abnormal behavior. For example, the predefined behavior profile may state that when a truck is slower than usual at stopping, a truck is slower than usual at starting, a truck requires a wide turn to make a U-turn, a truck swerves into a different lane during a U-turn, etc.

In some embodiments, the criteria module 206 generates a behavior model that generates the behavior profile, the behavior model learns on the fly, and the criteria module 206 updates the behavior model based on the vehicle type. In this example, the behavior model may include rules for normal behavior and abnormal behavior as a function of the vehicle type, thresholds for behaviors, and weights. The criteria module 206 may apply the weights to rules for normal behavior and abnormal behavior based on environmental information. For example, if it is raining, a lowboy trailer may take extra long to slow down. As a result, the weight may put less emphasis on slow driving as an indicator of abnormal driving.

The behavior model may be stored on the ego vehicle 123. In some embodiments, the criteria module 206 retrieves the behavior profile by querying the behavior model in the storage 241.

In some embodiments, the criteria module 206 transmits the behavior model to the cloud server 103 and/or the edge server 198 via the communication module 202. In some embodiments, the criteria module 206 downloads updates to the behavior model from the cloud server 103 and/or the edge server 198 via the communication module 202. The updates may include, for example, new definitions of remote vehicle types 124, new types of driving behavior, real-time updates on environmental conditions, such as weather, traffic accidents that would cause everyone to slow down or change lanes, etc.

The criteria module 206 compares the driving behavior of the remote vehicle 124 to the behavior profile for the type of the remote vehicle 124 and determines whether the driving behavior of the remote vehicle is abnormal or normal based on the comparing. For example, where an ego vehicle 123 is waiting at a turning light, if the remote vehicle 124 behind the ego vehicle 123 was a car that started to swerve into the next lane in order to make a turn, the criteria module 206 might categorize that behavior as abnormal driving behavior. But if the remote vehicle 124 is a tractor-trailer, swerving into the next lane is necessary given the narrow turning radius of the remote vehicle 124 and the criteria module 206 would categorize the driving behavior as normal.

In some embodiments where the criteria module 206 determines that the driving behavior of the remote vehicle 124 is abnormal, the criteria module 206 instructs the user interface module 208 to generate a notification for the driver 109 of the ego vehicle that the remote vehicle is driving abnormally. In some embodiments where the criteria module 206 determines that the driving behavior of the remote vehicle 124 is normal, the criteria module 206 does nothing and the process repeats with the sensor set 126 providing sensor data 196 to the criteria module 206 to compare to the behavior profile until the criteria module 206 identifies the driving behavior as abnormal. In some embodiments, the process repeats with the analyzing module 204 determining a type of remote vehicle 124 in response to the previous remote vehicle 124 changing lanes and a new remote vehicle 124 being behind (or within sensing range) of the ego vehicle 123.

In some embodiments where the vehicle control system 153 has implemented an ADAS system that is driving the ego vehicle 123, if the criteria module 206 determines that the driving behavior of the remote vehicle 124 is abnormal, the criteria module 206 notifies the vehicle control system 153 via the communication module 202 to stop the ADAS system and allow the driver 109 to take over. Because the abnormal driving behavior may cause the remote vehicle 124 to act erratically, having the driver 109 takeover driving increases the safety of the vehicle until the remote vehicle 124 is outside of sensor range.

In some embodiments, the driver 109 provides feedback about whether the remote vehicle 124 is driving normally or abnormally. The criteria module 206 may update the behavior model with the feedback from the driver 109 to classify the behavior of the remote vehicle 124 as normal or abnormal based on the feedback. In some embodiments, the criteria module 206 updates the behavior model after receiving a predetermined number of items of feedback. For example, the criteria module 206 updates the rules for abnormal behavior for a police vehicle as being abnormal behavior after receiving feedback six times for the driving behavior of a police vehicle. Increasing a threshold for categorizing driving behavior as abnormal driving behavior may result in failing to report some abnormal behavior. But decreasing the threshold for categorizing driving behavior as abnormal driving behavior may result in too many notifications and the driver 109 losing trust in the detection application 199. As a result, the criteria module 206 makes gradual modifications to the parameters and thresholds to maintain the driver's 109 trust in the system.

In some embodiments, the criteria module 206 transmits the feedback via the communication module 202 to the cloud server 103 and/or the edge server 198 so that the corresponding criteria module 206 on the cloud server 103 and/or the edge server 198 can update the behavior model to change parameters for normal driving behavior or abnormal driving behavior based on aggregated feedback from the driver 109 of the ego vehicle 123 and drivers 108 of remote vehicle 124 so that the modification is more reliable because it came from multiple different sources.

The user interface module 208 can be software including routines for generating GUI data 187 for displaying a user interface. In some embodiments, the user interface module 208 can be a set of instructions executable by the processor 125 to provide the functionality described below for generating the user interface. In some embodiments, the user interface module 208 can be stored in the memory 127 of the computer system 200 and can be accessible and executable by the processor 125. The user interface module 208 may be adapted for cooperation and communication with the processor 125 and other components of the computer system 200 via signal line 228.

The user interface module 208 generates GUI data 187 for displaying a user interface that provides information to a driver 109 of the ego vehicle. In some embodiments, if the criteria module 206 determines that the driving behavior of the remote vehicle 124 is abnormal, the user interface module 208 generates a notification that the remote vehicle 124 is driving abnormally. The user interface module 208 may generate graphical data that is displayed on a head-up unit of the ego vehicle 123, a display on a center console of the ego vehicle 123, a user device associated with the driver 109, such as a smartphone, etc.

Turning to FIG. 3, an example 300 of a heads-up display 305 is illustrated that includes a warning of abnormal driving behavior. In this example, the heads-up display 305 is between a driver 109 and a windshield of the ego vehicle 123 (including being overlaid on the windshield) and the heads-up display 305 includes a text warning that the emergency vehicle 310 in front of the ego vehicle 123 is driving abnormally. FIG. 3 is an example and intended only to be illustrative of some embodiments. In some embodiments, the detection application causes an image of a remote vehicle following behind the ego vehicle to be displayed to make the driver of the ego vehicle aware of abnormal driving behavior of the ego vehicle. In some embodiments, the detection application causes an image of a remote vehicle following behind the ego vehicle to be displayed to make the driver of the ego vehicle aware of abnormal driving behavior of the remote vehicle.

In some embodiments, the driver 109 provides feedback to the user interface. For example, in the example discussed with reference to FIG. 3, the driver 109 may provide feedback that the driving behavior that the criteria module 206 categorized as abnormal driving behavior is actually normal driving behavior. The driver 109 may provide the feedback directly to the heads-up display, a separate application, via a website after the driver 109 has finished the trip, etc. The user interface module 208 may transmit the feedback to the criteria module 206 via the communication module 202.

In some embodiments, the user interface module 208 generates GUI data 187 that displays a user interface with information about the roadway environment 140 that includes an option for the driver 109 to report abnormal driving behavior. Turning to FIG. 4, an example 400 of a mobile display device 405 with an option for reporting abnormal driving behavior is illustrated. The mobile display device 405 may be part of a center console of the ego vehicle 123, a tablet associated with the driver 109, etc. In this example, the user interface 407 includes a road with a remote vehicle 124 behind the ego vehicle 123. The user interface 407 includes the following text: "The truck behind you is driving normally." If the driver disagrees 109, she can press the button 420 stating "No! This is abnormal!" The user interface module 208 may transmit the feedback to the criteria module 206 via the communication module 202. In some embodiments, the cloud server (or the edge server) then uses this feedback from the driver to form a conclusion about the driving behavior by voting or getting one or more expert reviews about the driving behavior if the voting activity does not provide a conclusion.

In some embodiments, the user interface module 208 includes a user interface that includes system preferences where a driver 109 can configure scenarios where the user wants the detection application 199 to determine whether driving behavior is normal or abnormal. The user interface module 208 may include a list of scenarios where the driver 109 wants the detection application 199 to be generating sensor data 195 about remote vehicles 124 and performing analysis of the sensor data 195. For example, the detection application 199 may perform analysis in stop-and-go traffic, when the driver 109 is in an unfamiliar area, in response to a driver 109 request, etc. In some embodiments, the user interface module 208 generates a user interface that displays information about the driver's 109 roadway environment that includes a button (or some other selectable user interface element) that, when pressed, causes the detection application 199 to determine whether any of the remote vehicles 124 are driving abnormally.

Example Methods

Referring now to FIGS. 5, depicted is a flowchart of an example method 500 for determination of abnormal driving behavior according to some embodiments. The method 500 includes steps that may be executed in any order, and not necessarily those depicted in FIG. 5. In some embodiments, one or more of the steps are skipped or modified in ways that are described herein or known or otherwise determinable by those having ordinary skill in the art.

The method 500 may start at block 505. At block 505, a request is received to generate sensor data 195 for a remote vehicle 124 or identify a presence of the remote vehicle 124. For example, a drive 109 may request a determination of whether driving behavior is abnormal or the detection application 199 may start the process each time a new remote vehicle 124 is detected. Block 505 may be followed by block 510.

At block 510, sensor data 195 is generated that describes the remote vehicle 124 and the driving behavior of the remote vehicle 124. For example, the communication module 202 may transmit the sensor data 195 that describes the remote vehicle to the analyzing module 204 and the sensor data 195 that describes the driving behavior of the remote vehicle 124 to the criteria module 206. Block 510 may be followed by block 515. In some embodiments, if there is no connectivity, the detection system of the ego vehicle can observe sensor data describing the remove vehicle for a predefined amount of time or when the sensor data reaches to certain level; the detection system of the ego vehicle then triggers the abnormal driving behavior detection based on this analysis.

At block 515, a type of remote vehicle 124 is classified based on the sensor data 195. For example, an image of the remote vehicle 124 may be captured by cameras on the front of the ego vehicle 123 and the image is input into a machine-learning model. A type of vehicle is output by the machine-learning model. Block 515 may be followed by block 520.

At block 520, a behavior profile is retrieved for the type of the remote vehicle 124 that identifies criteria for the type of the remote vehicle 124 and classifications of abnormal driving behavior and normal driving behavior based on the criteria. The behavior profile may be retrieved from behavior profile data 132 stored in the memory 127 of the ego vehicle 123 or received from the cloud server 103 and/or the edge server 198. Block 520 may be followed by block 525. In some embodiments, the driver profile can also be retrieved from the one or more remote vehicles. For example, in some embodiments the operating environment 100 includes a vehicular micro cloud and the detection system is operable to send a query and check if any other micro cloud members have the driver profile.

At block 530 it is determined whether the driving behavior of the remote vehicle is abnormal. If the driving behavior is abnormal, block 530 may be followed by block 535. At block 535, a notification is provided to the driver 109 of the ego vehicle 123 that the remote vehicle is driving abnormally. If the driving behavior is not abnormal, block 530 may be followed by block 525 where the process of comparing the driving behavior of the remote vehicle to the behavior profile for the type of the remote vehicle repeats as new sensor data 195 is received until the driving behavior is determined to be abnormal. In some embodiments, the notification provided by the detection system includes a control suggestion. A control suggestion includes, for example, a lane change suggestion. If the driver accepts and applies the control suggestion then the behavior of the ego vehicle is corrected. If driver continues without adopting the control suggestion then the detection system of the ego vehicle infers that the abnormal driving detection concluded by the detection system is a false positive (or incorrect). The detection system then triggers the feedback mechanism to refine the detection system so that it improves its determinations over time.

FIG. 6 is a flowchart of another example method for determination of abnormal driving behavior according to some embodiments. The method 600 includes steps that may be executed in any order, and not necessarily those depicted in FIG. 6. In some embodiments, one or more of the steps are skipped or modified in ways that are described herein or known or otherwise determinable by those having ordinary skill in the art.

The method 600 may start at block 605. At block 605, a request is received to generate sensor data 195 for a remote vehicle 124 or identify a presence of the remote vehicle 124. For example, a drive 109 may have specified that the determination of whether driving behavior is abnormal occurs if the ego vehicle 123 is driving in rush-hour traffic. Block 605 may be followed by block 610.

At block 610, sensor data 195 is generated that describes the remote vehicle 124 and the driving behavior of the remote vehicle 124. For example, the communication module 202 may transmit the sensor data 195 that describes the remote vehicle to the analyzing module 204 and the sensor data 195 that describes the driving behavior of the remote vehicle 124 to the criteria module 206. Block 610 may be followed by block 615.

At block 615, a type of remote vehicle 124 is classified based on the sensor data 195. For example, an image of the remote vehicle 124 may be captured by cameras on the front of the ego vehicle 123 and the image is input into a machine-learning model. A type of vehicle is output by the machine-learning model. Block 615 may be followed by block 620.

At block 620, a behavior model is queried for a behavior profile for the type of the remote vehicle 124 that identifies criteria for the type of the remote vehicle 124 and classifications of abnormal driving behavior and normal driving behavior based on the criteria. For example, the behavior profile data 132 that includes the behavior profile is queried by the criteria module 206. Block 620 may be followed by block 625.

At block 625, the driving behavior of the remote vehicle 124 is compared to the behavior profile for the type of the remote vehicle 124. For example, the stop-and-go behavior of a bus is compared to the behavior profile for a bus. Block 625 may be followed by block 630.

At block 630, it is determined whether the driving behavior of the remote vehicle 124 is abnormal. For example, the criteria module 206 determines whether the stop-and-go behavior of the bus is considered abnormal driving behavior. If the driving behavior is abnormal, block 630 may be followed by block 635. At block 635, the driver 109 is notified of the abnormal behavior. If the driving behavior is not abnormal, block 630 may be followed by block 640. At block 640, feedback is received from a driver 109 that the driving behavior is abnormal. Block 640 may be followed by block 645.

At block 645, the behavior model is updated based on the feedback from the driver 109.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A detection application suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the detection application to become coupled to other detection applications or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A system of an ego vehicle comprising:
   a vehicle control system;
   a non-transitory memory; and
   an onboard unit communicatively coupled to the non-transitory memory and the vehicle control system, wherein the non-transitory memory stores computer readable code that is operable, when executed by the onboard unit, to cause the onboard unit to execute steps including:
   sensing a remote vehicle to generate sensor data describing the remote vehicle and driving behavior of the remote vehicle;
   classifying a type of the remote vehicle based on the sensor data;
   retrieving a behavior profile for the type of the remote vehicle that identifies criteria for the type of the remote vehicle and classifications of abnormal driving behavior and normal driving behavior based on the criteria, wherein classifications of normality are variable based on the type of the remote vehicle;
   comparing the driving behavior of the remote vehicle to the behavior profile for the type of the remote vehicle;
   determining that the driving behavior of the remote vehicle is abnormal based on the comparing and a driving maneuver to execute to eliminate an origin of the abnormal driving behavior, wherein the ego vehicle is autonomous; and
   autonomously executing, by the vehicle control system of the ego vehicle, the driving maneuver to eliminate the origin of the abnormal driving behavior.

2. The system of claim 1, wherein the steps further include:
   providing a notification to a driver of the ego vehicle that the remote vehicle is driving abnormally.

3. The system of claim 2, wherein retrieving the behavior profile includes querying a behavior model for the behavior profile and the steps further include:
   receiving feedback from the driver that the remote vehicle is abnormal; and
   updating the behavior model with the feedback from the driver to change parameters for determining that the driving behavior of the remote vehicle is normal.

4. The system of claim 1, wherein determining that the behavior of the remote vehicle is abnormal includes determining that the behavior of the remote vehicle satisfies a threshold similarity to the abnormal driving behavior in the behavior profile for the type of remote vehicle.

5. The system of claim 1, wherein the sensor data includes an image of the remote vehicle and wherein classifying the type of the remote vehicle includes comparing the image of the remote vehicle to a set of reference images of different types of vehicles.

6. The system of claim 1, wherein classifying the type of the remote vehicle is further based on information in a vehicle-to-everything (V2X) message received from the remote vehicle.

7. The system of claim 1, wherein retrieving the behavior profile includes receiving a predefined behavior profile from an edge server or a cloud server.

8. The system of claim 1, wherein the steps further include:
   prior to the sensing, receiving a request from a driver to determine whether the driving behavior of the remote vehicle is abnormal.

9. The system of claim 1, wherein sensing the remote vehicle occurs responsive to determining that the ego vehicle is in a driving scenario and that a driver of the ego vehicle requested a determination of whether the behavior of the remote vehicle is abnormal when the ego vehicle is in the driving scenario.

10. A method executed by a vehicle control system and an onboard unit of an ego vehicle, the method comprising:
    sensing, by a sensor set of the ego vehicle, a remote vehicle to generate sensor data describing driving behavior of the remote vehicle;
    classifying a type of the remote vehicle based on the sensor data;
    retrieving a behavior profile for the type of the remote vehicle that identifies criteria for the type of the remote vehicle and classifications of abnormal behavior and normal behavior based on the criteria, wherein classifications of normality are variable based on the type of the remote vehicle;
    comparing the behavior of the remote vehicle to the behavior profile for the type of the remote vehicle;
    determining that the behavior of the remote vehicle is normal based on the comparing, wherein the ego vehicle is autonomous; and
    autonomously executing, by the vehicle control system of the ego vehicle, a driving maneuver to eliminate an origin of the abnormal driving behavior.

11. The method of claim 10, wherein retrieving the behavior profile includes querying a behavior model stored on the ego vehicle for the behavior profile and the method further comprises:
    receiving feedback from a driver that the driving behavior is abnormal; and
    updating the behavior model with the feedback from the driver to classify the behavior of the remote vehicle as abnormal.

12. The method of claim 10, wherein the sensor data includes an image of the remote vehicle and wherein classifying the type of the remote vehicle includes comparing the image of the remote vehicle to a set of reference images of different types of vehicles.

13. The method of claim 10, wherein classifying the type of the remote vehicle is further based on information in a vehicle-to-everything (V2X) message received from the remote vehicle.

14. The method of claim 10, wherein retrieving the behavior profile includes receiving a predefined behavior profile from an edge server or a cloud server.

15. The method of claim 10, wherein the behavior of the remote vehicle is normal for the type of vehicle when the type of the remote vehicle is not a car and is abnormal if the type of the remote vehicle is the car.

16. A computer program product including computer code stored on a non-transitory memory that is operable, when executed by an onboard unit of an ego vehicle that is communicatively coupled to a vehicle control system, to cause the onboard unit to execute operations including:
- sensing, by a sensor set of the ego vehicle, a remote vehicle to generate sensor data describing the remote vehicle and driving behavior of the remote vehicle;
- classifying a type of the remote vehicle based on the sensor data;
- retrieving a behavior profile for the type of the remote vehicle that identifies criteria for the type of the remote vehicle and classifications of abnormal driving behavior and normal driving behavior based on the criteria, wherein classifications of normality are variable based on the type of the remote vehicle;
- comparing the driving behavior of the remote vehicle to the behavior profile for the type of the remote vehicle;
- determining that the driving behavior of the remote vehicle is abnormal based on the comparing, wherein the ego vehicle is autonomous; and
- autonomously executing, by a vehicle control system of the ego vehicle, a driving maneuver to eliminate an origin of the abnormal driving behavior.

17. The computer-readable medium of claim 16, wherein the operations further comprise:
- providing a notification to a driver of the ego vehicle that the remote vehicle is driving abnormally.

18. The computer-readable medium of claim 17, wherein retrieving the behavior profile includes querying a behavior model for the behavior profile and the operations further include:
- receiving feedback from the driver that the remote vehicle is abnormal; and
- updating the behavior model with the feedback from the driver to change parameters for determining that the driving behavior of the remote vehicle is normal.

19. The computer-readable medium of claim 16, wherein determining that the behavior of the remote vehicle is abnormal includes determining that the behavior of the remote vehicle satisfies a threshold similarity to the abnormal driving behavior in the behavior profile for the type of remote vehicle.

20. The computer-readable medium of claim 16, wherein the sensor data includes an image of the remote vehicle and wherein classifying the type of the remote vehicle includes comparing the image of the remote vehicle to a set of reference images of different types of vehicles.

* * * * *